United States Patent [19]

DeAngelis

[11] Patent Number: 5,615,107

[45] Date of Patent: Mar. 25, 1997

[54] POWER CONTROL METHOD AND APPARATUS

[75] Inventor: Peter C. DeAngelis, Carlsbad, Calif.

[73] Assignee: Fiskars Inc., Madison, Wis.

[21] Appl. No.: 441,765

[22] Filed: May 16, 1995

[51] Int. Cl.⁶ .................. G05B 11/01; H01H 43/04
[52] U.S. Cl. .................. 364/141; 364/143; 307/38; 307/141
[58] Field of Search .................. 364/132, 140–145; 307/11, 38–41, 112–115, 134, 138, 141, 141.4; 361/188, 195–198

[56] References Cited

U.S. PATENT DOCUMENTS

| | | | |
|---|---|---|---|
| 5,099,157 | 3/1992 | Meyer | 307/38 |
| 5,270,576 | 12/1993 | Kahle | 307/38 |
| 5,396,107 | 3/1995 | Shoji | 307/139 |
| 5,481,452 | 1/1996 | Simmons | 364/141 |
| 5,541,457 | 7/1996 | Morrow | 307/38 |

Primary Examiner—Roy N. Envall, Jr.
Assistant Examiner—Thomas E. Brown
Attorney, Agent, or Firm—Foley & Lardner

[57] ABSTRACT

The power control system includes a time controlled bi-stable device for causing at least one slave outlet to be controlled in response to a master unit being energized and/or de-energized. The system thus enables the slave outlet only to be energized, and not the master unit, if the master unit is energized, and then de-energized within a short predetermined time interval. Advantageously, the system of the present invention can be controlled remotely by using a conventional remote control device for a television receiver, and the audio from the television receiver is transmitted through the audio receiver. Thus, by using only the remote control device, either the television receiver can be used with the audio receiver, or the audio receiver can be used independently under the control of the television remote control device.

7 Claims, 3 Drawing Sheets

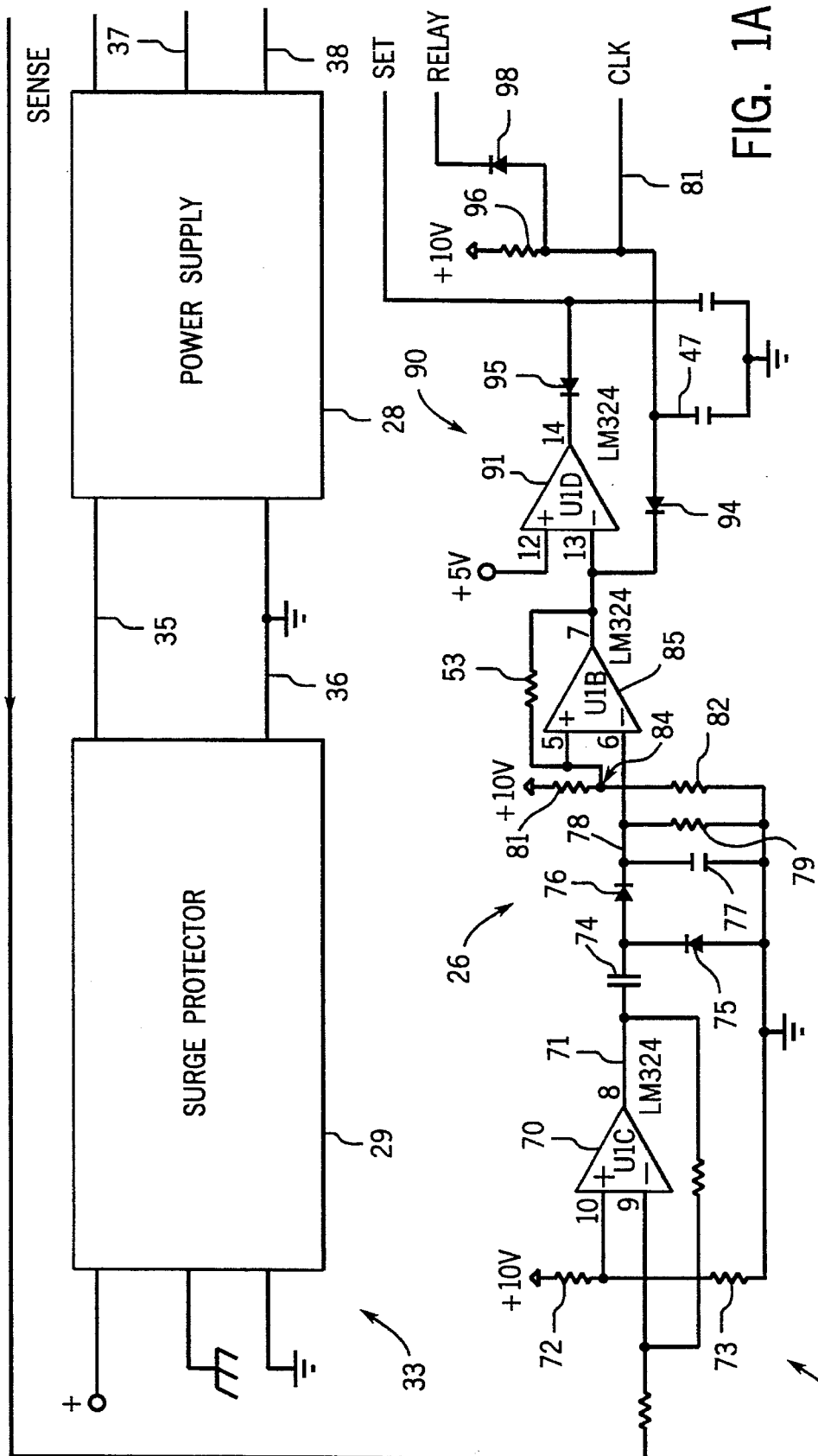
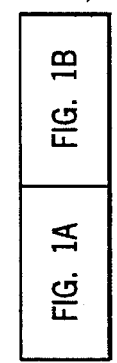
FIG. 1A
FIG. 1
| FIG. 1A | FIG. 1B |

POWER CONTROL METHOD AND APPARATUS

TECHNICAL FIELD

The present invention relates in general to a method and apparatus for controlling power to electrical equipment. More particularly, the present invention is related to a power control system and method of controlling power to a group of switchable electrical slave outlets to energize and de-energize electrical equipment connected thereto.

BACKGROUND ART

Systems and methods for controlling and conditioning electrical equipment is well known in the art. For example, reference may be made to the following U.S. Pat. Nos.: 4,709,318; 5,291,208; 5,315,533; and 5,384,712.

An example of a power control system for controlling electrical equipment is a power control arrangement for a computer system including components such as a computer processor unit, a monitor, a printer and a compact disk player. In this regard, the power control arrangement includes a master power supplying outlet having the computer processor unit connected thereto and a group of controlled slave outlets for supplying power to the other components. With this arrangement, whenever the computer processor unit is energized, the slave outlets supply power to the other components to energize them as well. Conversely, when the computer is de-energized, the slave outlets are de-energized causing power to be removed from the peripheral devices.

By utilizing such a power control arrangement, the user can advantageously activate or deactivate a group of components by merely activating or deactivating only one component of the group. An example of such a power control arrangement is disclosed in the foregoing mentioned U.S. Pat. No. 5,315,533 (FIG. 20).

While such power control systems have been successful for their intended use, they have not proven entirely satisfactory for controlling peripheral devices associated with home entertainment audio-visual systems. Such home entertainment systems can include television receivers, cable receivers, stereo audio receivers, compact disc players, cassette tape players and other such equipment. In this regard, the stereo audio receiver and its associated speakers may be used to provide the television audio from the television receiver.

In using such a home entertainment system, a user at any given time may desire to listen to only the audio produced by the audio components of the system, and not utilize the television receiver. Thus, if the prior known power control system is employed with such an audio-visual system, the television receiver and all of the other components can be activated simultaneously by merely turning on only one component such as the television receiver, when it is connected to a master outlet, and all of the other devices of the system are plugged into the slave outlets.

Therefore, it would be highly desirable to have a new and improved power control method and system, which could enable a user to energize or de-energize selectively only a single master unit to, in turn, energize or de-energize the other slave units simultaneously. A key feature of such an improved system would enable a user to energize only the slave units and not the master unit by controlling only a single unit.

DISCLOSURE OF INVENTION

Therefore, the principal object of the present invention is to provide a new and improved power control system and method of using it to control power supplied to a master unit and at least one slave unit wherein a user is able to energize selectively the system by controlling the power to only one unit, and yet be able to energize selectively a master unit and the associated slave unit simultaneously, or energize only the slave unit and not the master unit.

Briefly, the above and further objects of the present invention are realized by providing a new and improved power control system, which can be controlled in a very convenient manner according to a novel operation method of the present invention.

The power control system includes a time controlled bi-stable device for causing at least one slave outlet to be controlled in response to a master unit being energized and/or de-energized. The system thus enables the slave outlet only to be energized, and not the master unit, if the master unit is energized, and then de-energized within a short predetermined time interval.

Advantageously, the system of the present invention can be controlled remotely by using a conventional remote control device for a television receiver, and the audio from the television receiver is transmitted through the audio receiver. Thus, by using only the remote control device, either the television receiver can be used with the audio receiver, or the audio receiver can be used independently under the control of the television remote control device.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 1A and 1B when arranged side-by-side as shown in FIG. 1, illustrates a schematic block diagram of a power control system which is constructed in accordance with the present invention, and which is shown coupled between a group of master outlets having a sensing circuit and a group of slave outlets.

BEST MODE FOR CARRYING OUT THE INVENTION

Figure 1B:
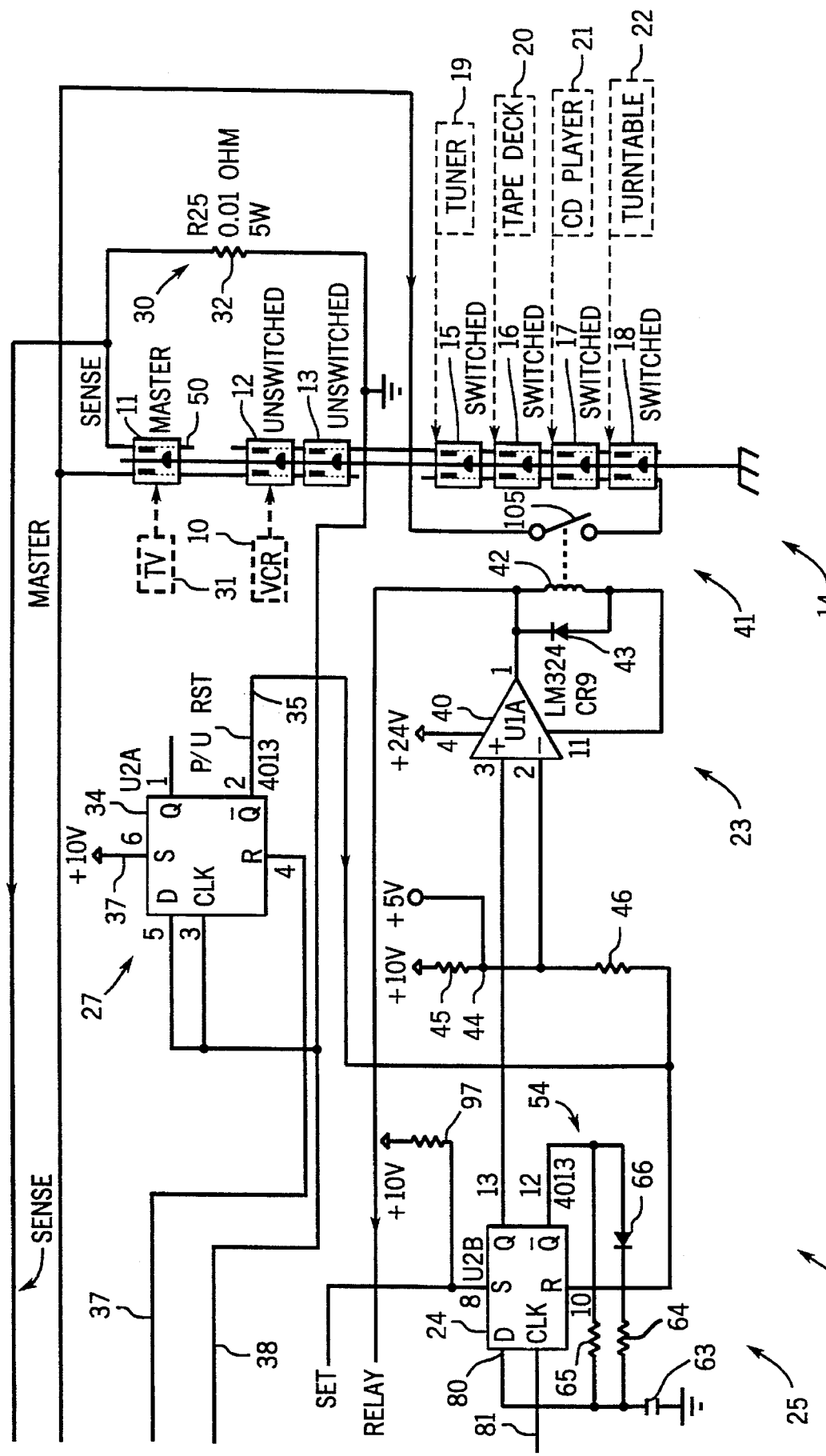

Referring now to the drawings and more particularly to FIG. 1 thereof, there is shown a power control system 9, which is constructed in accordance with the present invention, and which is illustrated coupled between a group master outlet 11 and a group 14 of slave outlets 15–18. Connected in this manner, the system 9 is used for controlling slave electrical equipment, such as an audio receiver 19, a tape deck 20, a compact disc player 21 and a turntable 22 whenever a master device 31, such as a television receiver having its power input connected electrically to the master outlet 11, is activated and deactivated electrically.

Other components, such as a video cassette recorder 10 are powered by one of a pair of unswitched outlets 12 and 13, since it may not be desirable to power control such components. In this regard, the outlets 11, 12 and 13 are energized electrically at all times as long as the system 9 is energized. It will become apparent to those skilled in the art that a stereo amplifier 19, for example, can be power controlled, since modern stereo receivers are equipped with electronic devices (not shown) which enable the stereo receiver to be connected to the power source, and then disconnected therefrom, and yet the stereo receiver will be returned to its initial condition when subsequently reconnected to the power source. Many video cassette recorders are not so equipped, and thus should not be power controlled.

In an actual example of the arrangement of components, the audio output (not shown) of the television receiver 31 can be coupled to the stereo receiver 19 and its associated speakers (not shown) so that the audio from the television receiver 31 can be amplified and thus heard emanating from the stereo audio components. Also, the receiver 31 and the audio components powered by the slave outlets 19–22 can all be energized simultaneously by activating only the television receiver 31. The power up operation can be conveniently accomplished remotely by a person using a conventional remote controller (not shown) to activate the television receiver 31 in a conventional manner. As hereinafter described in greater detail, the activation of the receiver 31 is sensed at the master outlet 11 by the system 9 which, in turn, activates all of the slave outlets 15–18 for energizing the audio components 19–22 to enable the television audio to be transmitted through the audio components. According to the invention, if desired, the television receiver 31 can be thereafter quickly de-energized in a conventional manner within a short predetermined time interval to cause the television receiver 31 to be deactivated and the system 9 maintains the power to the slave outlets and thus to the individual audio components connected to them so that the audio components can be utilized independently of the television receiver 31.

The system 9 generally includes a surge protector 29 and an internal power supply 28 disposed within a single housing (not shown) for the power outlets 11–13 and 15–18. In this manner, the power outlets can be protected from inadvertent power surges on the power line generally indicated at 33. A relay circuit indicated generally at 23 coupled to the slave power outlets 15–18 for enabling them to be electrically energized on or off in response to the sensing of the master device 31 being switched between on and off states, respectively. A bi-stable device, such as a timer latch 24 is coupled electrically to the relay circuit 23 for controlling it so that the slave outlets 15–18 are switched electrically between on and off states.

A time out circuit indicated generally at 25 is responsive to the bi-stable device 24 being set for initiating the short time out interval T (FIG. 2) to determine whether or not a slave only bypass state is desired as will be explained hereinafter in greater detail. A detector circuit indicated generally at 26 is responsive to the master device (the television receiver) 31 being de-activated for causing the bi-state device 24 to remain in a set state when the master device 31 is deactivated electrically prior to the expiration of the time out interval to cause the relay circuit 23 and the slave outlets 15–18 to continue to be energized.

The time out interval T is between about 13 seconds and one second. A more preferred time out interval T is between about 10 seconds and four seconds, while the most preferred time out interval is about five seconds.

In operation, when a user desires to activate electrically both the television receiver 31 and the slave equipment (the audio components powered from the slave outlets 15–18), the user electrically energizes the television receiver 31 by its power on-off switch (not shown), or by using a remote controller (not shown). When power is applied to the receiver 31, a master sensing circuit generally indicated at 30 including a current sensing resistor 32 which detects electrical current flowing in the master outlet 11 to generate a signal SENSE as indicated diagrammatically in FIG. 2.

In response to the signal SENSE, the sensing circuit 30 causes the bi-stable device 24 to be set. In this regard, the output Q of the bi-stable device 24 is coupled to the relay circuit 23 to cause a relay 41 to be operated. The relay 41 closes its normally opened contacts 105 to, in turn, complete the electrical connection of the power indicated as MASTER (FIG. 1) from the power supply 28 to the slave outlets 15–18 to apply power to the slave audio components 19–22 (which were all previously set to their on conditions).

Thus, at this point, the television receiver 31 and all of the audio components 19–22 are energized and functioning.

If the user desires to utilize the slave components 19–22, but not the master television receiver 31, the user deactivates the master television receiver 31 via its power switch (not shown) or remote controller (not shown) prior to the expiration of the time out interval T, such as about a five second interval. In this regard, the detector circuit 26 (FIG. 1A) generates a SET signal at the output of an operational amplifier 91 which changes from a logic HIGH level to a logic LOW level when the master receiver 31 is deactivated. The detector 26 also causes a clock signal CLK to be generated to cause the bistable device 24 to remain set. If the time out interval T has not expired, the clocked set input 80 (FIG. 1B) remains at a sufficient logical HIGH level above a threshold level 107 as indicated in FIG. 2, to cause the device 24 to remain set when the signal CLK occurs. Therefore, the relay circuit 23 and the slave outlets 15–18 continue to be electrically energized.

If the user delays deactivating the master television receiver 31 for a period longer than the time out interval T, such as when the user desires to maintain all of the components activated, the capacitor 63 will have discharged below threshold level 107, and the clocked set input signal for the set input 80 becomes LOW, so that when the detector 26 generates the CLK signal 81, the latch 24 resets to cause the relay 41 to restore and thus de-energize the slave outlets 15–18.

Considering now the relay driver circuit 23 in greater detail, the relay driver circuit 23 generally includes an operational amplifier 40 for supplying current flow selectively to a relay coil 42 of the relay 41 for causing it to operate. The relay 41 draws about 20 milliamperes, which is the rated minimum output sourcing current of the operational amplifier 40. At this current, the output voltage drop across the relay 41 is about 2 volts below the supply voltage to dissipate about 40 millivolts in the operational amplifier, which is preferably an LM324 operational amplifier.

A diode 43 connected across the relay coil 42 provides a safe path for the inductive back current as the magnetic field collapses. The relay 41 has a 16 ampere rating which is sufficient for switching power to the slave outlet group 14.

Considering now the system 9 in greater detail, a power up reset circuit 27 detects whenever electrical power is applied by the power supply 28 via the surge protector 22 to the set of primary power lines indicated generally at 33. The surge protector 29 couples power to the power supply 28 via a pair of power conductors 35 and 36. The power-up reset circuit 27 generally includes a latch 34 which generates a power-up reset signal (P/U RST) on a reset line 35 and a conventional RC timing circuit (not shown) which controls the timing of when the latch 34 is switched from a normally RESET state to a SET state. The latch 34 includes a force reset input connected to a line 37.

The power-up circuit 27 generates the power-up reset signal P/U RST on the reset output of a latch 34. The power-up reset signal indicated on the reset line 35 provides two functions: 1) it forces a reset of the bi-stable device 24, and 2) it causes the negative input of the relay driver operational amplifier 40 to be initially at a logical HIGH level to prevent the relay 41 from being energized when the system 9 is initially powered up.

Thus, in operation, when the system 9 is initially energized, the respective force set and reset inputs of the latch 34 are both at a logic HIGH. When both the respective SET and RESET inputs of the latch 34 are at a logic HIGH, both the set output and the reset output of the latch 34 is at a logic HIGH. In this regard, the power-up reset signal P/U RST on the line 35 is at a logic HIGH.

After the initial time delay, the force reset input of the latch 34 drops to a logic LOW. In this regard, the SET signal of the latch 34 remains at a logic HIGH holding the latch 34 in a SET state to cause the power-up reset signal P/U RST 35 to transition to a logic LOW.

From the foregoing, it will be understood by those skilled in the art that the power up reset signal P/U RST on line 35 remains at a logical HIGH level for a short interval of time when the system 9 is initially powered up. After the initial time delay interval, the latch 34 is prevented from being reset.

When the power-up reset signal on line 35 drops to a logic LOW level, the reset on the latch 24 is removed and the operational amplifier relay driver 40 is enabled allowing the relay 41 to be energized as soon as the latch 24 is set.

Figure 2:
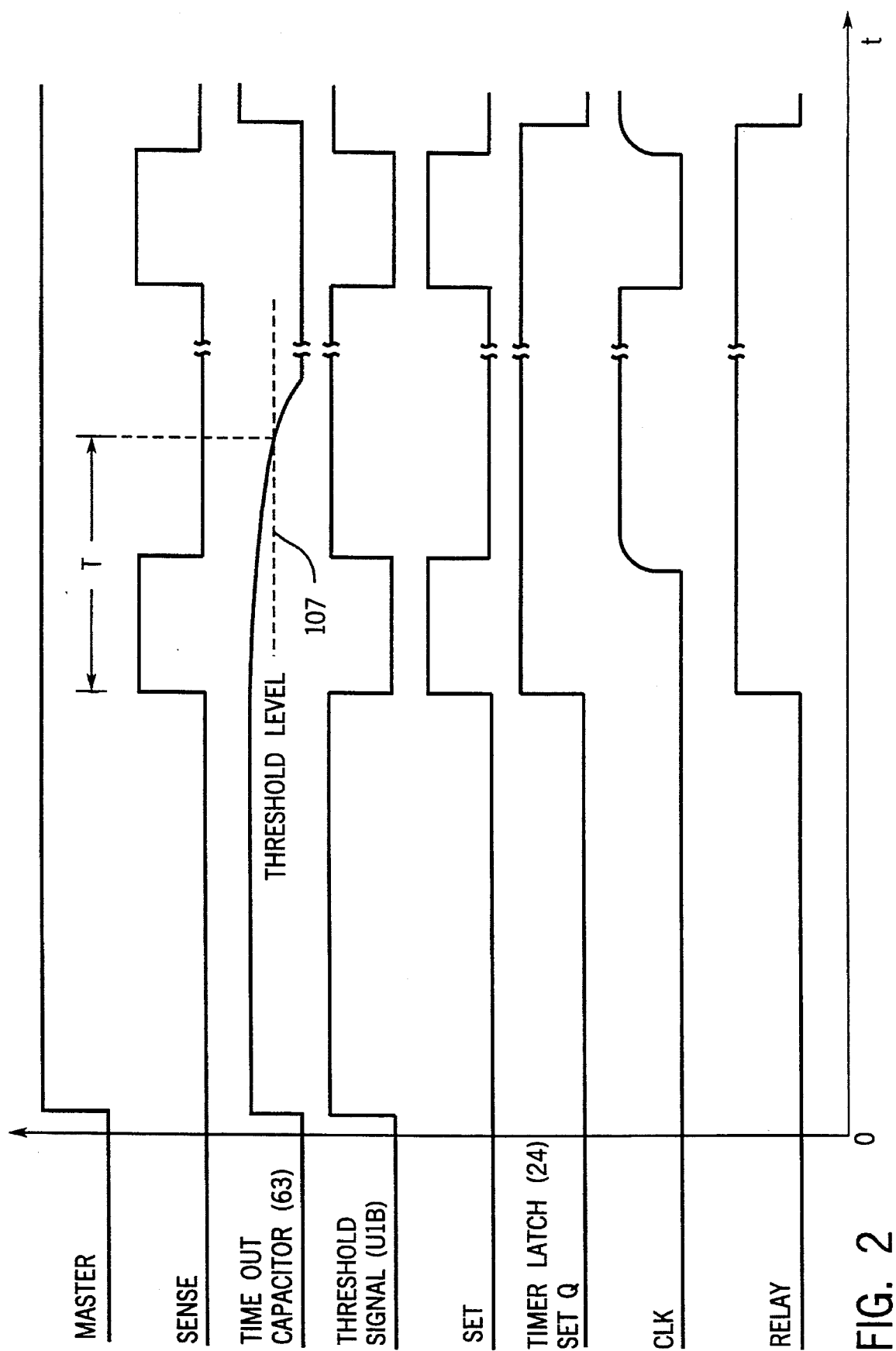
FIG. 2 is a timing diagram illustrating the control signals generated by the control system of FIG. 1.

Considering now the current sensing arrangement in greater detail with reference to FIG. 1B, a master outlet neutral line 50 is connected to the grounded sense resistor 32. The sense resistor 32 is a 5 watt, 0.01 ohm resistor. Based on the size of the sense resistor 32, a 60 watt resistive equipment load draws about 0.5 amperes of current from the master outlet 11 to cause a voltage drop of about 5 millivolts AC across the sense resistor 32.

Considering now the detector arrangement 26 (FIG. 1A) in greater detail, a current detection operational amplifier 70 responds to the signal SENSE from the resistor 32 and amplifies the 5 millivolt drop by a gain of about 500 to produce an output signal on an outline line 71. The output signal is about 2.5 volts AC or 7.07 volts peak-to-peak. A pair of resistors 72 and 73 on the positive input of the operational amplifier 70 function as a voltage divider, creating a 20 millivolt DC offset, to swamp the input offset errors of the operational amplifier 70. The 20 millivolt DC offset creates a DC voltage on the output of the operational amplifier 70 of about 10 volts on which the 2.5 AC voltage is superimposed.

A 0.1 μf coupling capacitor 74 connected to the output line 71 couples the AC portion of the output signal from the operational amplifier 70 to the next stage of the detection circuit 26. In this regard, the capacitor 74 filters out the DC component of the output signal of the operational amplifier 70.

A pair of diodes 75 and 76 respectively form a peak detector. In this regard, when the alternating current output signal from the operational amplifier 70 is negative; the capacitor 74 is charged through the diode 75. Similarly, when the output signal from the operational amplifier 70 is positive, the charge across the capacitor 74 is passed through diode 76 to a charge holding capacitor 77. The voltage at the capacitor 77 is at the peak-to-peak alternating current voltage output of the operational amplifier 70 less the voltage drop across the diode pair 75 and 76, less the drop due to a mid stage resistor 79. This high mid stage signal on line 78 is buffered by an operational amplifier 85 which functions as the output of the threshold detector 26.

The output of the peak detector circuit including the operational amplifier 70 is connected via the output line 78 to a negative input of the operational amplifier 85. In this regard, the operational amplifier 85 functions as a comparator to compare the voltage across the capacitor 77 to a threshold reference voltage created by a pair of resistors 81 and 82 connected in series. The resistors 81 and 82 are connected at a common node 84 which is at about V/2 equaling about five volts. Thus, the resistors 81 and 82 function as a voltage divider to establish a threshold reference voltage V/2 which is applied to a positive input of the operational amplifier 85.

A 1M ohm positive feedback resistor 53 is coupled between the output of operational amplifier 85 and the positive reference voltage input at node 84 and provides a hysteresis shift to the reference voltage input.

When the negative input at a negative input node 84 of the operational amplifier 85 is LOW, the output voltage of the operational amplifier 85 is at about 22 volts to cause about 16 microamperes of current to flow through the feedback resistor 53 to the positive input node 84 of the operational amplifier 53. The feedback, in turn, increases the threshold voltage from about 5 volts to about 5.8 volts.

When the master load is decreased, the output of the threshold detector operational amplifier 85 is switched from a LOW output to a HIGH output as the direct current voltage drops below 4.8 volts. The typical threshold points, which may vary slightly, are about 0.54 amperes AC (64 watts) to turn on, and about 0.46 amperes AC (55 watts) to turn off, based on a 120 VAC source.

Considering now the detector arrangement 26 in still greater detail, an inventor circuit indicated generally at 90, is coupled between the output of the operational amplifier 85 and the force set of the latch 24. The inventor circuit 90 includes an operational amplifier 91 which inverts the output signal of the amplifier 85. A positive input to the operational amplifier 91 is connected to a positive 5 volt reference level node 44.

A pair of diodes 94 and 95 block a 24 volt output of the operational amplifier 90 to prevent damage to the timer latch 24 which operates at 10 volts. In this regard, the anode of the diode 94 is connected to a clock node 95 which in turn is connected to the clock input of the timer latch 24 via the line 81 supplying the signals CLK. A 51K ohm resistor 96 is connected between the +10 V output of the power supply 28 and the clock node 95 to pull up a clock input signal CLK for the timer latch 24 to 10 volts. Similarly, another 51K ohm resistor 97 is connected between the force SET input of the timer latch 24 and +10 V output of the power supply 28 to pull up the force SET input signal for the timer latch 24 to 10 volts.

The output signal from the operational amplifier 85 pulls the clock input to the timer latch 24 LOW through the diode 94, while the output of the inventor operational amplifier 91 pulls the SET input to the timer latch 24 LOW through the diode 95.

Considering now the time out circuit 25 in greater detail, the circuit 25 generally includes a bypass circuit 54 having a resistor 65, a resistor 64, and a diode 66, which are connected in parallel between the capacitor 63 and the reset output $\overline{Q}$ of the timer latch 24, for enabling this capacitor 63 to be charged when the timer latch 24 is reset and to discharge when the timer latch 24 is set. The bypass circuit 54 as will be explained in greater detail, generates the time out interval T to facilitate the functional operation of the system 9.

Considering now the timer latch 24 in greater detail with reference to FIG. 1B, the timer latch 24 is a CMOS part No. CD4013B "D" type flip-flop. In this regard, the clock input of the latch 24 on line 81 is a positive edge trigger CKL signal (FIG. 2) that will cause the SET output of the timer latch 24 to be set to the state of the SET input 80 to the timer latch 24. Also, a logical HIGH on the force SET input to the timer latch 24 forces the SET output of the timer latch 24 to a logic HIGH level while a logical HIGH on the force reset input of the timer latch 24 forces the reset output to a logic HIGH.

Now considering the operation of the bypass circuit 54 and timer latch 24 in still greater detail, when the equipment attached to the master outlet 11 is turned on, the output of the inventor 90 goes to a logic HIGH level. The diode 95 blocks the 24 volt output of the inventor operational amplifier 91 and resistor 97 provides the pull-up voltage to the force set input of the latch 24. A diode 98 inhibits the clock input on line 81 if the relay 41 is not energized, preventing the latch 24 from latching on improperly.

An RC network that includes a capacitor 47 and the resistor 96, provide a 3 millisecond delay, to allow the force set input for the timer latch 24 to drop to a logic LOW level before the clock input signal on line 81 reaches its trigger point. When the clock input signal on line 81 reaches the trigger point or a logical HIGH level, the timer latch 24 is set to the state of the SET input 80. In this regard, if the charge on the capacitor 63 is still sufficiently high on the SET input 80 (above the 5 volt level), the SET output of the latch timer 24 remains at a logic HIGH level, and thus, does not change states (reset) thereby maintaining the slave outlets 15–18 energized and the slave equipment 18–22 powered up. This is called the BYPASS MODE of operation.

If the bypass signal on the SET input is below the 5 volt threshold level 107 (FIG. 2), which is indicative of capacitor 63 being substantially discharged, the SET output of the timer latch 24 becomes a logic LOW level, which in turn causes the relay 41 to be turned off. In this regard, the reset output of the timer latch 24 becomes a logic HIGH level. When the reset output timer latch 24 goes to a logic HIGH level, capacitor 63 is recharged to 10 volts through the diode 66 and resistor 64 in about one second.

With reference to FIG. 2 as well as to FIGS. 1A and 1B of the drawings, the details of the operation will now be considered in connection with the maintaining of the set condition of the latch 24 during the bypass mode of operation. As shown in FIG. 2, the signal SET changes to a LOW level upon the de-energization of the television receiver 31. The diode 98 is back biased by a plus 24 volt signal on the lead RELAY. Also, the diode 94 is back based by the plus voltage at the output of the operational amplifier 85. Thus, the signal CLK is generated on the lead 81 for the latch 24. In this regard, the plus 10 volt signal through the resistor 96 is supplied to the clock input to the latch 24. Thus, when the voltage on the timing capacitor 63 is sufficiently high to provide an input to the D input at the lead 80 and the signal CLK is supplied to the clock input to the latch 24, the latch 24 remains set and does not reset. Thus, the relay driver 40 and the relay 41 remain energized, thereby maintaining the slave outlets 15 through 18 energized.

It should be understood that the signal CLK as shown in FIG. 2 is controlled by the capacitor 47 which charges to plus ten volts through the resistor 96 to ensure that the signal SET goes to ground before the CLK is fully generated so that the latch 24 is controlled by the input D when the signal CLK is fully generated.

The preferred components or their values for the for the system 9 are identified in the drawings.

The preferred components or their values for the system 9 are identified in the drawings.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A power control system responsive to master sensing means detecting the activating and deactivating of master electrical equipment connected to a master outlet for controlling slave electrical equipment connected electrically to at least one switchable slave outlet, comprising:

switching means coupled to the slave outlet for enabling it to be electrically energized on or off in response to the master electrical equipment being switched between on and off states respectively;

switching control means coupled to said switching means for controlling it so that the slave outlet is switched electrically between on and off states;

time delay means responsive to said control means being set for initiating a time delay interval signal to determine whether a slave only bypass state is desired; and said slave outlet control means responsive to said time delay signal for electrically enabling said switching means whenever the master equipment is switched on, for electrically enabling and maintaining on said switching means wherein the master equipment is switched on and then off within about T seconds, and for electrically disabling said switching means whenever the master equipment is switched on and then off but not within about T seconds; and detector means responsive to the master sensing means detecting that the master equipment has been de-activated for maintaining said control means set when the master equipment was activated and then deactivated prior to the expiration of the time out interval of T seconds to cause said switching means and the slave outlets to continue to be energized;

whereby whenever the master equipment connected electrically to the master outlet is switched on and then off within about T seconds, the master equipment is electrically de-energized and the slave outlet is continued to be electrically energized to maintain the slave equipment to be electrically energized.

2. A power control system according to claim 1, wherein said switching means includes:

a relay circuit coupled to the slave outlet for switching it between on and off states; and a relay driver coupled to said bi-stable means for driving said relay mechanism between on and off states.

3. A power control system according to claim 2, wherein said relay circuit includes a relay switch for switching the switchable slave outlet between on and off states; and an inductive coil coupled to said relay switch for generating a magnetic field of sufficient strength to close said relay switch.

4. A power control system according to claim 3, wherein said relay circuit further includes a diode connected across said inductive coil for providing a return path for inductive kick-back current as said magnetic field collapses in response to said relay circuit being switched to an off state.

5. A power control system according to claim 1, wherein said control means is a latch having a clock input, a set input, a force set input, a reset input, and a force reset input.

6. A power control system according to claim 5, wherein said latch is a flip-flop that switches when a clock signal is present on said clock input to a SET state when a corresponding logic HIGH set signal is present on said set input and to a RESET state when a corresponding logic LOW signal is present on said set input.

7. A method of controlling electrical equipment connected to at least one switchable slave outlet in response to master sensing means detecting the activating and deactivating of master electrical equipment connected to a master outlet comprising:

enabling switching means coupled to the slave outlet to be electrically energized on or off in response to the master electrical equipment being switched between on and off states respectively;

setting switching control means coupled to said switching means for controlling it so that the slave outlet is switched electrically between on and off states;

responding to said control means being set by initiating a time out interval signal to determine whether a slave only bypass state is desired; and responding to said time out signal by electrically enabling said switching means whenever the master equipment is switched on and then off within about T seconds and by electrically disabling said switching means whenever the master equipment is switched on and then off but not within about T seconds;

wherein whenever the master equipment connected electrically to the master outlet is switched on and then off within about T seconds, the master equipment is electrically de-energized and the slave outlet remains electrically energized to maintain said slave outlet energized; and responding to the master sensing means detecting that the master equipment has been de-activated for maintaining said control means set when the master equipment is activated and then de-activated prior to the expiration of the time out interval of T seconds to cause said switching means and the slave outlets to continue to be energized.

* * * * *